(12) United States Patent
Zayas (10) Patent No.: US 8,375,865 B2
(45) Date of Patent: Feb. 19, 2013

(54) OVERHEAD SUSPENDED PERSONAL TRANSPORTATION AND FREIGHT DELIVERY SURFACE TRANSPORTATION SYSTEM

(76) Inventor: Jose Alberto Zayas, San Juan, PR (US)

( * ) Notice: Subject to any disclaimer, the term of this patent is extended or adjusted under 35 U.S.C. 154(b) by 0 days.

(21) Appl. No.: 13/115,961

(22) Filed: May 25, 2011

(65) Prior Publication Data

US 2012/0055367 A1 Mar. 8, 2012

Related U.S. Application Data

(60) Provisional application No. 61/402,711, filed on Sep. 3, 2010.

(51) Int. Cl.
*B61J 3/00* (2006.01)

(52) U.S. Cl. .......... 104/88.01; 104/89; 105/148

(58) Field of Classification Search .... 104/88.01–88.06, 104/89, 281–286
See application file for complete search history.

(56) References Cited

U.S. PATENT DOCUMENTS

| | | | | |
|---|---|---|---|---|
| 3,118,392 A * | 1/1964 | Zimmerman | | 104/124 |
| 3,225,228 A * | 12/1965 | Roshala | | 310/12.09 |
| 3,444,823 A * | 5/1969 | Akmentin | | 105/64.2 |
| 3,534,689 A * | 10/1970 | Barthalon | | 104/89 |
| 3,580,181 A * | 5/1971 | Bertin et al. | | 104/23.2 |
| 3,690,266 A * | 9/1972 | Mayo | | 104/123 |
| 3,799,061 A * | 3/1974 | Bertin | | 104/23.2 |
| 3,861,315 A * | 1/1975 | Rypinski | | 104/18 |
| 3,915,093 A * | 10/1975 | Barthalon et al. | | 104/89 |
| 3,987,734 A * | 10/1976 | Horn | | 104/88.03 |
| 4,057,017 A * | 11/1977 | Michalon | | 104/20 |
| 4,314,512 A * | 2/1982 | Gerhard et al. | | 105/149 |
| 4,703,697 A * | 11/1987 | Bell | | 104/23.1 |
| 4,944,227 A * | 7/1990 | Madsen | | 104/103 |
| 5,381,737 A * | 1/1995 | Trenary | | 105/34.1 |
| 5,535,963 A * | 7/1996 | Lehl et al. | | 244/3 |
| 6,178,892 B1 * | 1/2001 | Harding | | 104/155 |
| 6,622,637 B2 * | 9/2003 | Cummins | | 105/199.2 |
| 6,810,817 B1 * | 11/2004 | James | | 104/88.04 |
| 6,834,595 B1 * | 12/2004 | Henderson | | 104/88.01 |
| 7,124,692 B2 * | 10/2006 | Guenther et al. | | 105/148 |
| 7,497,167 B2 * | 3/2009 | Bellezza | | 104/88.01 |
| 7,578,240 B2 * | 8/2009 | Shiwaku | | 104/89 |
| 7,845,284 B2 * | 12/2010 | Izumi et al. | | 104/88.02 |
| 2003/0047106 A1 * | 3/2003 | Rajaram | | 104/89 |
| 2005/0081736 A1 * | 4/2005 | Koide | | 104/88.01 |
| 2006/0016363 A1 * | 1/2006 | Nakao et al. | | 104/88.01 |
| 2006/0096494 A1 * | 5/2006 | Owens | | 104/88.01 |
| 2006/0156944 A1 * | 7/2006 | Vetesnik | | 104/89 |
| 2006/0230975 A1 * | 10/2006 | Shiwaku | | 104/88.01 |
| 2007/0017410 A1 * | 1/2007 | Guenther et al. | | 104/14 |
| 2007/0119332 A1 * | 5/2007 | Henderson | | 104/307 |
| 2007/0163461 A1 * | 7/2007 | Shiwaku | | 104/89 |
| 2008/0066640 A1 * | 3/2008 | Hutchinson | | 104/89 |
| 2009/0090267 A1 * | 4/2009 | Bruns | | 104/89 |
| 2009/0120320 A1 * | 5/2009 | Kato | | 104/89 |
| 2012/0055367 A1 * | 3/2012 | Zayas | | 104/88.01 |

* cited by examiner

*Primary Examiner* — Jason C Smith
(74) *Attorney, Agent, or Firm* — Harpman & Harpman (57) ABSTRACT

A personal transportation and freight delivery system that can be operated as a fully automated driverless land transportation system consisting of vehicles that move on their own propulsion on a pair of overhead parallel steel rails that form a single track and allows people to go anywhere the tracks can take them and delivery of freight anywhere along the tracks. Passengers and freight are transported inside a module that hangs from a propulsion dolly with in-line wheels to roll along such tracks. Electric motors are used for propulsion with power supplied at the tracks assembly; however, the system is also suited for internal combustion engines. There's no need for track switches to route vehicles to its destination as each vehicle has a steering mechanism. Rubber bumpers at each end of the propulsion dollies allow the vehicles to fit bumper-to-bumper along the tracks.

7 Claims, 9 Drawing Sheets

INDICATES TRACK ABOVE
– – – – – INDICATES TRACK BELOW

FIG. 19

OVERHEAD SUSPENDED PERSONAL TRANSPORTATION AND FREIGHT DELIVERY SURFACE TRANSPORTATION SYSTEM

CLAIM OF PRIORITY

Applicant claims the benefits of priority to U.S. Provisional Application No. 61/402,711 filed Sep. 3, 2010.

FEDERALLY SPONSORED RESEARCH OR DEVELOPMENT

Not Applicable

OTHER MATERIAL SUBMITTED SEPARATELY

Not Applicable

FIELD OF THE INVENTION

This invention pertains to the movement of people, livestock and goods in large quantities fast and efficiently using vehicles that go on their own propulsion from one place to another moving on a pair of parallel overhead steel rails that form a single track but it is different to a passengers or freight train and a typical monorail in several ways: there are no car bodies that move over the rails or a single rail as in a monorail, instead passengers and freight are transported inside a module that hangs from a motorized dolly that uses in-line wheels to roll along the tracks, there are no crossings along the tracks path and there's no need for track switches to route vehicles to its destination since each vehicle has a steering mechanism.

BACKGROUND OF THE INVENTION

The use of cars and freight trucks as our primary land transportation system is prone to traffic jams and accidents that take a fair toll of life, productivity and energy resources. This is so because while we keep building new roads there are usually more cars and trucks than the roads can handle, petroleum is a limited resource and above all because the system is obsolete in many ways since it still relies on traffic signals and the ability of people to drive their cars and trucks as it has been for the past one hundred years. There are also other economic issues and environmental concerns that question the use of cars and trucks as our primary transportation option. Even when collective transportation is constantly improving people still prefer a personal transportation vehicle that takes them anywhere they want.

In the U.S. the Intelligent Transportation Systems initiative or ITS (www.itsa.org) promotes the development and implementation of new technologies to allow for automated driving and indeed improve the efficiency and safety of personal transportation and freight delivery using cars and trucks. So far it has proven very costly and difficult to do so. The main flaw of the ITS initiative is assuming that the primary vehicle for automated personal transportation and freight delivery will still be a car and a freight truck when it looks like it is more complex and costly adapting a car and a truck to this concept as cars and trucks are meant to be driven than developing and implementing a totally new fully automated personal transportation and freight delivery system from the start.

A transportation system of automated vehicles that run on steel tracks and other custom built guide ways in use today at several locations is known as Personal Rapid Transit (PRT) (http://en.wikipedia.org/wiki/personal_rapid_transit). It is not a reliable or efficient personal transportation and freight delivery alternative to a car and a freight truck because such vehicles only go from one station to another as a collective transportation system does and the only similarity to a personal transportation system is that people can travel in a private vehicle. Another drawback of current PRT is that you could end up waiting in line for a long time until a vehicle is available to pick you up.

In U.S. Pat. No. 3,118,392 Zimmerman proposes a transportation system of self-propelled individual vehicles that automatically move from station to station using an overhead guideway. As with PRT his proposal is not a reliable or efficient personal transportation and freight delivery alternative to a car and a truck because the vehicles only go from one station to another as a collective transportation system does. As the system must rely on switching devices at the guideway and moving parts at a motorized carriage to engage and activate the switching devices so as to direct a vehicle to a destination it is not a practical proposition for a fast speed high volume transportation system of vehicles that could go on their own anywhere a track can take them.

A square shaped enclosed guideway makes it difficult to provide maintenance to the inside of the guideway and have access to the motorized carriages; furthermore, the flanges that support the wheels of the carriages could bend under heavy loads and as the thickness of the guideway is increased to prevent this then the guideway could become too heavy for all practical purposes. Motorized carriages moving inside the guideway will result in high levels of friction, noise and heat that will require additional control mechanisms and mechanical contacts between the motorized carriage and the guideway for positioning the carriage within the guideway channel particularly when each carriage will have at least two front and two rear wheels to support the vehicles weight.

In U.S. Pat. No. 3,987,734 Horn proposes a transportation system that features modules for carrying passengers and freight from station to station attached to a conveyor and there's a transfer device to load and unload vehicles into the conveyors. It is obvious that this proposal is not a practical personal transportation and freight delivery alternative to a car and a truck either because the vehicles can only go from one station to another and then the system depends on additional devices and a complex procedure to divert vehicles from one track to another and the vehicles will have to wait in line to do so; furthermore, as such vehicles have no propulsion of their own if the conveyor breaks down the complete system is stalled.

In U.S. Pat. No. 5,074,220 Petersen proposes an overhead rapid transit system using a tubular enclosed guideway and self-propelled vehicles with a steering mechanism and in-line wheels. The main drawback of this proposal is the guideway configuration for several reasons: 1—In the preferred embodiment it will only allow vehicles to do either right or left turns at guideway splits but not both depending on which side of the guideway an offset open slot is provided. 2—In the preferred embodiment the wheels of the motorized carriage or trolley will have to cross over the guideway slot at splits causing the vehicle to bounce and vibrate. 3—Any of the embodiment alternatives will require additional control mechanisms and mechanical contacts within the guideway and the motorized carriage or trolley for steering the vehicle and keeping it stabilized at guideway splits as the concave wheels track is no longer present at those guideway segments.

An enclosed guideway as noted makes it difficult to provide maintenance to the inside of the guideway and have access to the motorized carriage or trolley; furthermore, the bottom wall of the guideway that supports the wheels of the motorized carriage or trolley could bend under heavy loads and as the thickness of the guideway is increased to prevent this then the guideway could become too heavy for all practical purposes. A wheel with rounded traction rolling inside a concave track within an enclosed guideway and additional mechanical contacts between the vehicle and the guideway for steering and stability will result in high levels of friction, noise, heat, wear and tear.

In U.S. Pat. No. 6,202,566 Hutchinson proposes a high-speed high-capacity transportation system using an overhead guideway and wheeled motive modules with a steering mechanism that ride within the guideway channel to carry payloads. It is not a reliable or efficient personal transportation alternative to a car because a passengers carriage is considered payload too. It is obvious from the Patent Drawings and the Detailed Description of the Invention that it will be very difficult to keep the payload stable as it travels to its destination and for the same reason to do it at high speeds. Since the wheeled motive modules is generally much smaller than the payload units these must be positioned further apart from each other for safety reasons and as a result less of them will fit inside a track section as it should for optimal performance.

As with the Zimmerman Patent a square shaped enclosed guideway makes it difficult to provide maintenance to the inside of the guideway and have access to the wheeled motive modules; furthermore, the flange that supports the modules could bend under heavy loads and as the thickness of the guideway is increased to prevent this then the guideway could become too heavy for all practical purposes. Wheeled motive modules inside an enclosed guideway will result in high levels of friction, noise and heat that will require additional control mechanisms and mechanical contacts between the vehicle and the guideway for positioning the motive modules within the channel particularly when each carriage will have at least two front and two rear wheels to support the vehicles weight. Another drawback of this proposal is that at the guideway forks the wheeled motive modules have to ride over a slot through which a payload-holding flange must pass causing the vehicles to bounce and vibrate.

In U.S. Pat. No. 7,124,692 Guenther, et al. proposes an overhead high speed mass transit passenger and freight transportation system that will operate as an overhead suspended light rail (train). It is meant to operate as a collective transportation system does and not as a personal transportation and freight delivery system and as such vehicles only go from one station to another and the system must rely on track switches to route vehicles to a station as vehicles have no steering mechanism to get to a destination on their own.

Other important features that a reliable and efficient automated personal transportation and freight delivery system should have and seems to be missing in the prior art are: 1—A way to fit into a track section as many vehicles as it can hold moving at high speeds in a safe manner to improve performance. 2—A way to allow vehicles to go from a higher track section to a lower one and vice versa in a short linear track section. 3—A way to allow vehicles to travel high into a building. 4—A way to remove disabled vehicles from track sections.

SUMMARY OF THE INVENTION

This invention is about a personal transportation and freight delivery system that can be operated as a fully automated driverless land transportation system consisting of vehicles that go on their own propulsion from one place to another moving on a pair of overhead parallel steel rails that form a single track and respond to voice or panel commands to drive itself to a physical address anywhere the tracks can take them. This capability represents true door-to-door driverless personal transportation and freight delivery that no other transportation system in use today can claim. Prior art contraptions that resemble features of this invention are not a practical proposition for a personal transportation and freight delivery system that allows people to go anywhere they want and delivery of freight anywhere along the tracks as explained in the Background of the Invention, the main drawback of previous proposals being the vehicles guideway configuration. The invention includes features that a reliable and efficient automated personal transportation and freight delivery system should have and seems to be missing in the prior art as mentioned in the Background of the Invention. This Invention Specification is about how the proposed transportation system works and how to have it built and operated by those skilled in the art and science of fully automated rail transportation systems using conventional automation methods and equipment, it is not about the actual automation process that makes the system work. This invention represents a novel definite solution for a reliable, safe and efficient automated personal transportation and freight delivery alternative to a car and a delivery truck using vehicles that move on steel tracks. The novel features that are considered characteristic of this invention are set forth with particularity in the Claims section.

Passengers and freight are transported inside a module that hangs from a propulsion dolly with in-line wheels to roll along the tracks; thus, a vehicle consists of three main parts: a propulsion dolly, a passengers or freight module and a hanger to suspended the module from the dolly. The simplest arrangement of a propulsion dolly consists of a two wheels dolly with a rear drive wheel that provides movement and a front wheel used for direction. A dolly can have several wheels while a module can have more than one dolly to hang from as will be the case for modules with extended cabs or heavy freight loads. Propulsion is provided by one or more electric motors in the dolly that run on electric power supplied at the tracks using a conventional railway power supply configuration and distribution grid; however, the system is also suited for vehicles driven by internal combustion engines for feasible applications. Rubber bumpers attached at each end of the propulsion dollies allow the vehicles to travel bumper-to-bumper touching each other at a uniform constant speed during rush hour for optimal performance of the system. As the vehicles travel bumper-to-bumper touching each other at high speeds the system resembles a canning or bottling line in full operation. Passengers and freight modules can be any size and take any shape as long as they fit within the tracks boundaries and are able to traverse the curved and inclined track sections. Vehicles are privately owned and passengers are expected to ride with the same comforts and amenities of a modern automobile. Vehicles can have movable seats so passengers can adjust them to face the forward movement or look back as the vehicle moves along the tracks.

Location markers and conventional electronic signals in the tracks along with sensors in the vehicles allow a computer on board each vehicle to use a navigation software to determine the exact position of a vehicle at any time and program the fastest way to a destination. The information is relayed wireless and over cable to computers at a master control that identifies each vehicle then handles and monitors vehicular flow along the tracks networks or trackways. Once the vehicles start moving there's no need for them to stop until they reach their destination as there are no crossings along the tracks path and there's no need for track switches to route vehicles to its destination since each vehicle has a steering mechanism. Tracks merge and split in "Y" shaped junctions and forks track sections. This configuration allows the propulsion dolly wheels to follow a continuous path from beginning to end of a programmed trip. To diverge from a track a relay will signal the steering mechanism of a vehicle to turn either side at forks. When vehicles merge into another track they only have to follow the track they are in while the steering mechanism remains idle. As the vehicles merge the system resembles a zipper being closed and as the vehicles diverge the system resembles a zipper being opened. The propulsion dolly motor will slow down or speed up controlled by a computer on board each vehicle to allow the vehicles to keep on rolling and merge without colliding with each other automatically.

Tracks networks or trackways include ascending and descending track sections, interchanges between parallel tracks of vehicles moving in the same direction and crossover tracks interchanges. The vehicles passengers module can travel close to the ground as a car does and over obstacles including cars and pedestrians along elevated track sections. Some track sections are designated to leave and pickup passengers at home and institutional, commercial and public spaces. Vehicles moving along elevated track sections will ride a loop until a space is available to leave and pickup passengers and will then descend to pedestrian level to do so. Once passengers leave their vehicles these can be sent anywhere on their own to pickup and transport other passengers or to a designated parking space and then these can later be recalled using a cell phone. Specialized multi story mechanized parking buildings for such vehicles are foreseen. The vehicles freight modules can also travel close to the ground to allow for easier loading and unloading of the modules. Detachable cargo containers can also be used instead of freight modules.

The tracks structural components consist of commercially available round or square steel poles usually with a cross brace attached in a "T" shaped configuration to support the tracks assembly that consists of a steel pipe with steel ties attached to it to hold the rails in place very much like modern steel roller coaster tracks in use today looks like. Concrete columns and beams can also be used as tracks structural components. Heavy duty track networks or trackways are only used to carry freight vehicles with heavy loads. Tracks can go inside a building, around buildings attached to the buildings and from one building to another attached to bridges high above the ground. To get high into a building and to a higher or a lower track vehicles travel a spiral track section. When vehicles get inside an enclosed space they can only come out traversing across the same track section they got in. As vehicles with only one direction wheel can only move forward only vehicles with direction wheels at both ends of the propulsion dolly can do that.

Since such vehicles get their power from the tracks assembly there's no need to recharge them. A power meter and a relay device in each vehicle communicating wireless and over cable with a processing center allows for automatic electronic transactions so that each vehicle owner can be charged to their account for power consumption, tolls and vehicle registration. Batteries on each vehicle will provide for emergency power backup. If a vehicle losses propulsion due to a malfunction it will be pushed at the bumpers by other vehicles to the next emergency exit. In the event of an accident or structural failure of the tracks a master control can stop all vehicles at once and redirect traffic. Vehicles can also be stopped manually from the inside of a passengers module or by using an external emergency stop button on premises accessible to anyone as a safety measure while they move close to the ground such as when leaving or picking up passengers. Catwalks with stairs to ground level installed at a convenient distance one from the other allow passengers to leave their vehicles in an emergency situation when the passengers modules are high above the ground.

Accordingly it is the object of this invention to provide a personal transportation and freight delivery system that: 1—Is easy to build, setup and operate as a fully automated transportation system by those skilled in the art and science of fully automated rail transportation systems using conventional automation methods and equipment. 2—Is a reliable, safe and efficient alternative to a car and allows people to go anywhere they want using their own fully automated vehicle that moves on steel tracks and no one has to drive. 3—Is a reliable, safe and efficient alternative to a delivery truck using fully automated vehicles that move on steel tracks and no one has to drive to deliver all sorts of goods and merchandise anywhere along the tracks. 4—Can transport a single passenger more efficiently than a car does. 5—Uses less land than streets, highways and freeways construction does. 6—Adapts easily to the existing urban outline. 7—Contributes less environmental pollution than cars and trucks do. 8—Allows children, older people and people with disabilities to provide their own personal transportation since no driving skills are needed to operate such vehicles. 9—Allows passengers to carry out other activities while they go from one place to another since there's no need to drive such vehicles. 10—Have the least moving parts subject to wear and tear and most components are easily accessible for proper maintenance and repairs. 11—Allows vehicles to travel over obstacles including cars and pedestrians. 12—Allows vehicles to travel inside a building and into an office space or a living space several stories above ground. 13—Allows vehicles to travel from one building to another at any height from the ground. 14—Enables a more comfortable ride for passengers than a car does in curved and inclined path stretches.

DESCRIPTION OF THE INVENTION

The preferred embodiment of the invention and how it works will now be described in detail, another embodiment of the invention and how it works is described further on in this section.

Figure 1:
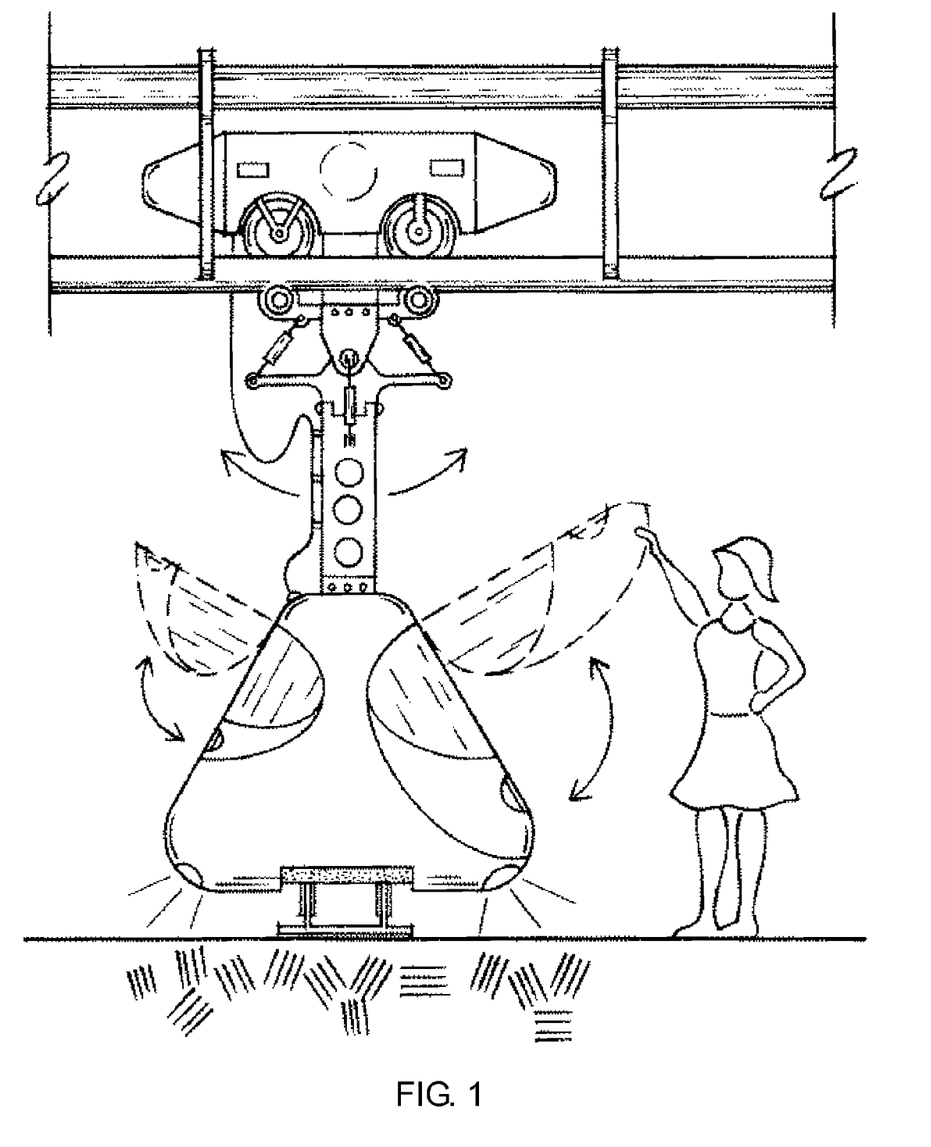
FIG. 1 is the Invention Specification Front Page view that shows a side view of a single passenger module at pedestrian level, a side view of a propulsion dolly inside a track section and the components used to hang the module from the dolly of the preferred embodiment of the invention with no reference characters.
Figure 2:
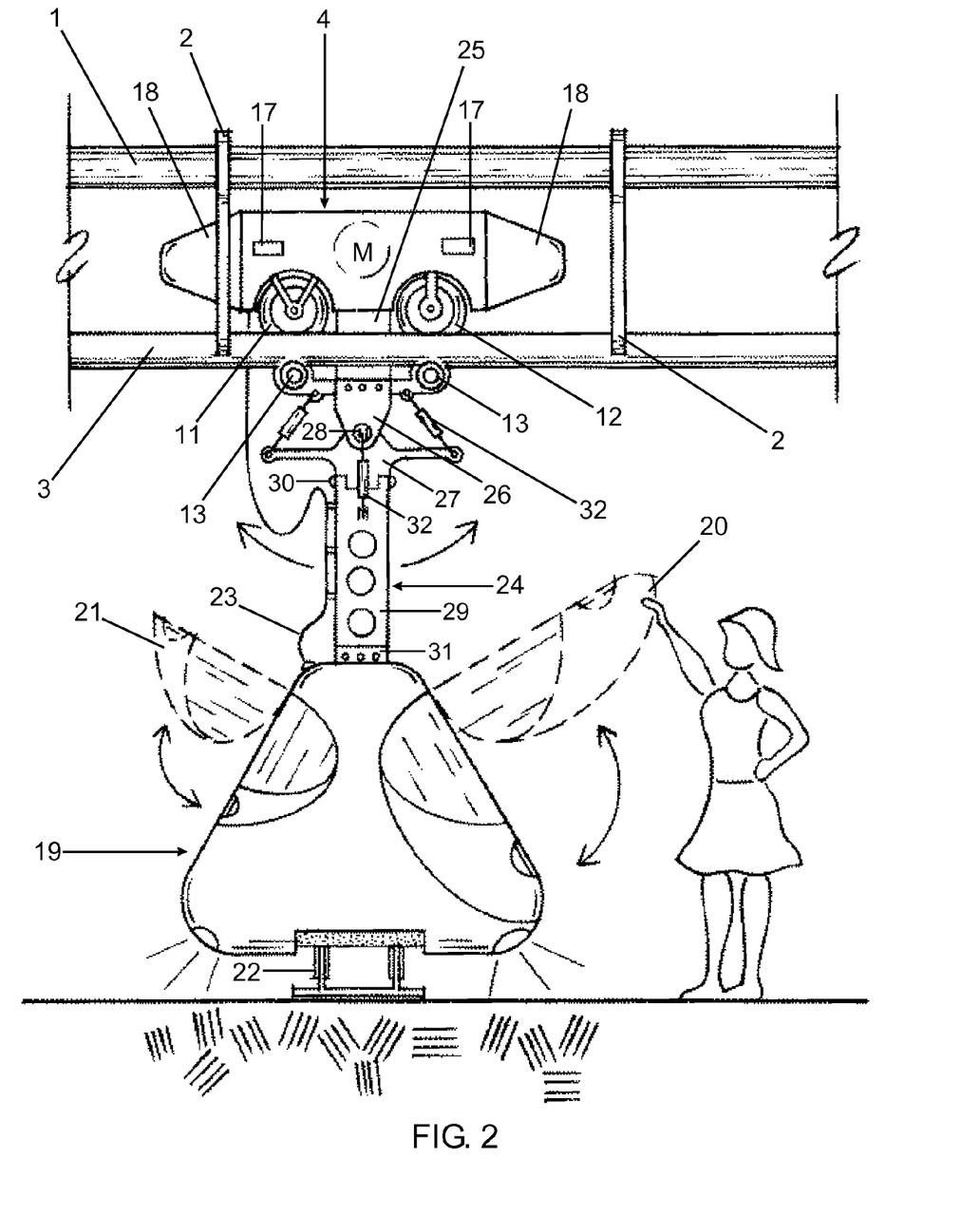
FIG. 2 shows a side view of a single passenger module at pedestrian level, a side view of a propulsion dolly inside a track section and the components used to hang the module from the dolly of the preferred embodiment of the invention with reference characters.
Figure 3:
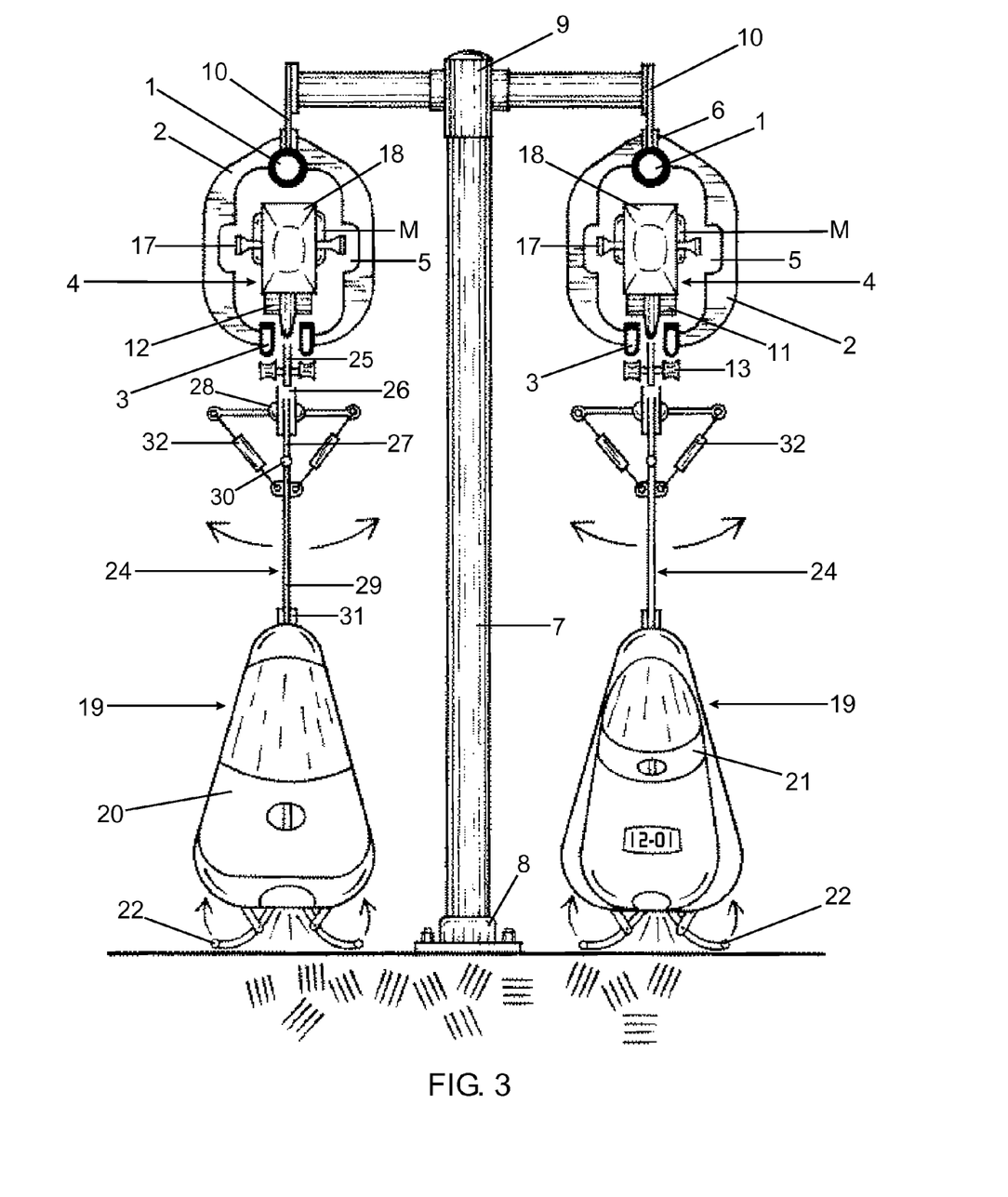
FIG. 3 shows two parallel tracks with vehicles moving in opposite directions, the front view (the left one) and a rear view (the right one) of a single passenger module at pedestrian level similar to the one seen in FIGS. 1 & 2, the front and rear view of a propulsion dolly similar to the one seen in FIGS. 1 & 2 inside the tracks assembly and a transversal cut view of the tracks assembly steel rails and structural steel pipe, the components used to hang the module from the dolly and a "T" shaped pole and cross brace configuration to hold in place the tracks assembly of the preferred embodiment of the invention with reference characters.

The tracks assembly shown in FIGS. 2 & 3 consists of a structural grade round steel pipe 1 with steel ties attached to it 2 that hold in place the steel rails 3 that form a single track for the propulsion dolly 4 to roll within. Steel rails can take any shape as long as they are capable of keeping the dolly wheels in place and support the vehicles weight. FIG. 2 shows a side view of a track section while FIG. 3 shows a transversal cut view of the tracks assembly steel rails and the structural steel pipe of two parallel tracks with vehicles moving in opposite directions. To provide electric power for the vehicles each tie shows a cut 5 in FIG. 3 on both sides were a metal channel can be installed, not shown, for power lines and a third rail to go through from which the vehicles can take electric power. This is only one of several ways those skilled in the art of electrifying railways will be able to provide electric power for the vehicles using a conventional power supply configuration and distribution grid similar to the one electric trains use. Electrification needs only to be installed on one side of the tracks but as two tracks merge into one and one track splits in two the third rail vehicles take the power from will need to change sides as it will become obvious to anyone implementing the system. That is why the propulsion dolly should be able to take power from either side as described further in this section of the Invention Specification. Ties are made of cast iron or stamped steel and the rails are made of extruded hollow or solid steel sections. Pipes, ties and rails are welded to each other or held together using mechanical fasteners. Flanges welded to the pipe 6 in FIG. 3 are used to suspend the tracks assembly from the pole and cross brace configuration shown in FIG. 3. Two reinforced concrete beams, not shown, installed parallel to each other can also be used instead of the steel assembly shown in FIGS. 2 & 3 to conform a track, steel rails are then attached to the top and the bottom of the beams to get the same results as with the steel tracks assembly shown in FIGS. 2 & 3. No other prior art referred to in the Background of this Invention Specification proposes a track assembly or guideway built in a similar way.

In FIG. 3 a prefabricated pole 7 with a metal base 8 is made out of a structural grade round steel pipes and a prefabricated cross brace 9 is made out of structural grade round steel pipes welded together and installed on-site to the poles. Square steel pipes can be used as poles too. Each pole requires a reinforced concrete foundation, not shown, and the poles are then secured to stud bolts in the foundation with nuts. At both ends of the cross brace a steel plate 10 attached with screws and nuts to the cross brace is set between the two flanges 6 of the tracks assembly and a pin, not shown, that goes through a hole in the steel plates and the flanges is used to suspend the tracks assembly from the pole and cross brace assembly. A single side brace, not shown, is used when there is only one track and several post and brace assemblies connected to each other, not shown, can be used when there are more than two tracks. This is only one of many configurations those skilled in the art of steel structures will be able to build to hold the tracks in place. A typical steel or reinforced concrete column and a steel truss configuration, not shown, can also be used to hold the tracks in place. Track sections can be installed on top of each other so tracks networks or trackways can be stacked over each other several tracks high. Heavy duty track assemblies and structural configurations, not shown, are used to carry vehicles with heavy freight loads over tracks networks or trackways designated for freight transportation exclusively.

Track sections of the desired length and type are fabricated in steel workshops then transported and set up on site very much like modern steel roller coaster tracks are built and installed today. Several types of track sections are used in the networks or trackways, these can be straight ones, curved ones, straight ascending and descending track sections, curved ascending and descending track sections and merging and diverging "Y" shaped junctions and forks track sections. These are welded to each other on site or held together using mechanical fasteners to form a continuous track same way it is done in railways and roller coasters installations. Ascending and descending track sections, interchanges, crossovers, junctions and forks track sections will require a more elaborated structural configuration to hold the tracks assembly in place than the one shown in the drawings of this Invention Specification but still within the scope of those skilled in the art of steel structures.

A vehicle consists of three main parts: a propulsion dolly, a passengers or freight transportation module and a hanger to suspend the module from the dolly.

A propulsion dolly 4 in FIGS. 2 & 3 has two in-line wheels to roll along the tracks, the rear one 11 is the drive wheel that makes the vehicle move and the front one 12 is used for direction. As a direction wheel always have to move in front of a drive wheel a vehicle can only move forward so it can get to the corresponding destination unless both propulsion dolly end wheels can provide direction. The drive wheel 11 is shown attached to the dolly rear suspension while the direction wheel 12 is shown attached to a forked pipe that allows side movements of the wheel. Only important features of the propulsion dolly needed to describe how the invention works are depicted in the drawings. The dolly structural frame or chassis, the wheels suspension, electrical components and other components details are subject to the interpretation of those skilled in the art of building motorized vehicles and not shown. A propulsion dolly can take any form and shape.

Figure 4:
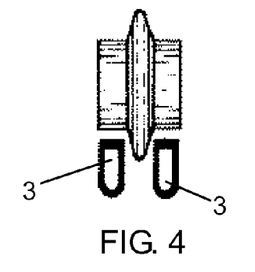
FIG. 4 shows the front or rear view of a propulsion dolly wheel set over the track formed by two parallel steel rails shown in a transversal cut view with reference characters, no contact is depicted between the wheel and the rails in the drawing for clarity.
Figure 5:
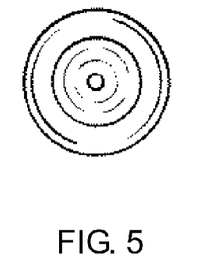
FIG. 5 shows a side view of a propulsion dolly wheel.

Dolly wheels consist of three parts, it has two sides that rest over parallel steel rails and a center part that protrudes into the track formed by the two parallel steel rails to provide for direction, keep the wheels inside the track and prevent the dolly from tipping over. FIG. 4 shows the front or rear view of a dolly wheel set over the track formed by two parallel steel rails 3 shown in a transversal cut view, no contact is depicted between the wheel and the rails in the drawing for clarity. FIG. 5 shows a side view of a dolly wheel. Smaller wheels or rollers 13 in FIGS. 2 & 3 glide against the steel rails convex bottom for additional vehicle stability and a safer ride. The steel rails bottom can take any shape to accommodate all sort of wheels or rollers designs that are capable of providing vehicle stability and a safer ride. When vehicles merge and split in the "Y" shaped junctions and forks track sections one side of the dolly wheels always rest over a track rail and a cut, not shown, at the track steel rails convex bottom is needed to allow the smaller wheels or rollers to leave a rail and engage another as it will become evident to anyone implementing the system. No contact is depicted either between the dolly wheels, the smaller wheels or rollers and the rails in FIG. 3 for clarity. The "V" shaped part of the wheel that protrudes into the track as shown in FIGS. 3 & 4 is intended to minimize friction. Those skilled in the art of building trucks or bogies for railway carriages should be able to determine the optimal contact area between a wheel and a rail and the wheels "V" shape form and length. The wheels contact surface that rest against the rails could have a replaceable exterior ring made of a composite material that provides a better traction than steel in all types of weather. A propulsion dolly can have more than two wheels and a vehicle can have more than one propulsion dolly as needed but every vehicle must have at least one drive wheel and one direction wheel. No other prior art referred to in the Background of this Invention Specification proposes using wheels and a track guideway built and used in a similar way.

Figure 6:
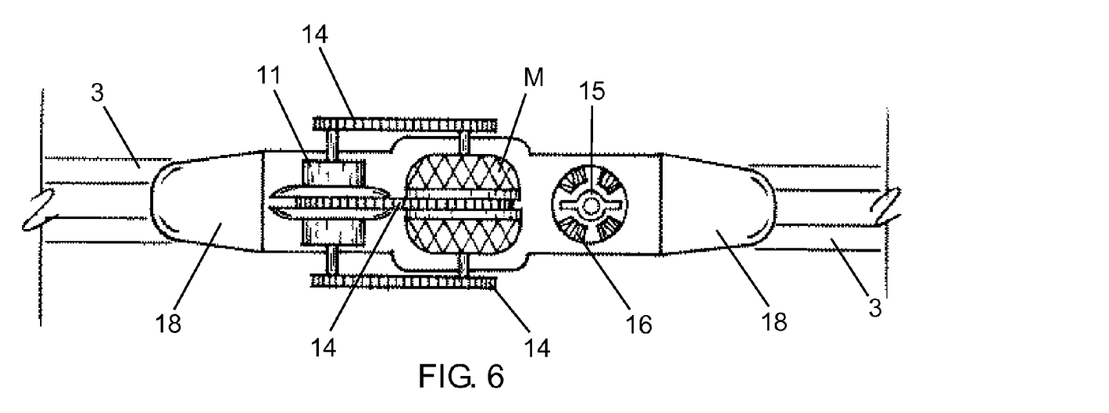
FIG. 6 shows the rear wheel and motor inside a propulsion dolly seen from above and the vehicle direction mechanism of the preferred embodiment of the invention with reference characters.

An electric motor in the propulsion dolly M in FIGS. 2, 3 & 6 provides torque to the rear drive wheel. Torque from the motor can be transferred to the rear wheel in several ways and anyone skilled in the art of building vehicles powered by electric motors should be able to accomplish this. FIG. 6 shows how to do this using a conventional sprocket and chain drive mechanism. A novel way to transfer torque from the motor to the rear wheel and is one of the claims for this invention is to split the motor and the rear wheel in two similar sections as shown in FIG. 6 then set the sprocket and chain at the center of the motor and the rear wheel 11. Same thing can be done with a set of pinions, not shown. In a more conventional way sprockets 14 and chains are attached to an axle that extends from the motor and the rear wheel at either side of the dolly or on both sides. Same thing can be done with belts, not shown. Direct torque electric motors, not shown, set at the propulsion dolly wheels are another option for propulsion very much like those used in hybrid cars. When direct torque electric motors are used then wheels that provide both movement and direction are also possible. The system is also suited for vehicles driven by internal combustion engines, not shown, for feasible applications.

To diverge from a track an electrical relay signals the steering mechanism of a dolly to turn the direction wheel either side at forks. A simple mechanism to accomplish this is to have a direction wheel attached to a forked pipe or a rod very much like those used in bicycles but instead of a handlebar at the other end it has iron flanges 15 in FIG. 6 while the forked pipe or rod is attached to the suspension assembly of the direction wheel, not shown. Electromagnetic coils 16 in FIG. 6 when energized attract the iron flanges of the forked pipe or rod to make it turn either side at the precise moment so as to direct the vehicle to the corresponding track. The direction wheel needs to turn only for a split second because once the direction wheel engages the diverging track the wheel only has to follow it. When vehicles merge into another track the steering mechanism remains idle since the direction wheel only has to follow the track the vehicle is in. This simple steering mechanism can be set up in several ways and more complex conventional steering mechanism can be incorporated into the propulsion dolly by those skilled in the art of motorized vehicles steering mechanisms.

In FIGS. 2 & 3 17 represents an electrical side contact "shoe" either at the front or the rear of the propulsion dolly used to take electric power for the vehicle from a third rail that runs inside a metal channel attached to the tracks ties, not shown, as previously described. A dolly should be able to take power from either side as shown in FIG. 3 since the third rail that carries electrical power at the tracks needs to change sides at tracks junctions and forks as it will become obvious to anyone implementing the system.

Both ends of a propulsion dolly have rubber bumpers 18 in FIGS. 2, 3 & 6 that allow the dollies to fit along the tracks bumper-to-bumper touching each other while the vehicles travel at a uniform constant speed during rush hour for optimal performance of the system. Bumpers can take any shape and have shock absorbers too but these most extend from the dolly as much as needed so as to prevent passengers or freight modules from hitting each other when the vehicles are moving bumper to bumper. How much bumpers can extend from a dolly is limited by the pitch of ascending and descending track sections. The triangular shape of the dolly bumpers in FIG. 2 is meant to allow the dollies to travel up and down ascending and descending track sections without hitting the track rails. An extension of the dollies structural frame, not shown, allows the use of smaller bumpers.

Figure 7:
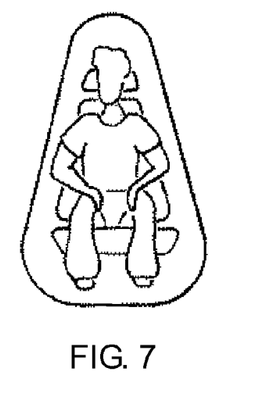
FIG. 7 shows a front view of the general ergonomic disposition of a passenger inside a module cab that carries only one passenger.
Figure 8:
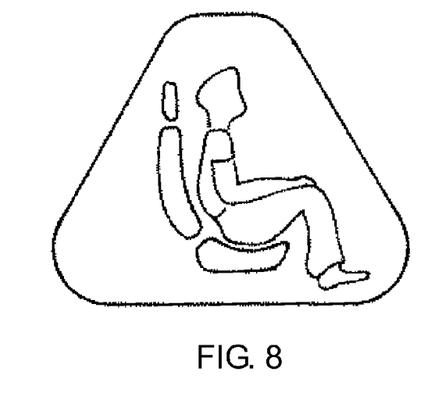
FIG. 8 shows a side view of the general ergonomic disposition of a passenger inside a module cab that carries only one passenger.

A passengers module 19 as shown in FIGS. 2 & 3 will carry one passenger that gets inside the module lifting a front door 20 yet conventional side doors can also be used, not shown, a back door 21 opens to a storage trunk. FIGS. 7 & 8 show a front and side view of the general ergonomic disposition of a passenger inside the cab of a module that carries only one passenger. Designing modules ergonomically allows for smaller vehicles than a standard car and allows the system to transport a single passenger more efficiently than a car does. Same principle applies to freight modules and cargo containers. Passengers and freight modules can be any size and take any shape as long as they fit within the tracks boundaries and are able to traverse the curved and inclined track sections so the angle of curved track sections and the pitch of ascending and descending track sections determines the length of a vehicle as it will become obvious to anyone implementing the system. Standardized vehicles length makes it easier for the system's master control to determine how many vehicles will fit within a particular tracks network or trackway. Modules with extended cabs, not shown, can fit several passengers inside and bigger freight payloads. Detachable cargo containers can also be used instead of freight modules. Passengers and freight modules can be fabricated of light structural metal frames wrapped in metal or fiberglass sheets very much like a train carriage and a helicopter cab are built and detachable cargo containers can be made of molded fiber reinforced plastic. A metal stand 22 in FIGS. 2 & 3 that a passenger manually extends and retracts from the inside of a module keeps the module stable when not in use and when passengers get in and out of a module very much like an emergency break is used in a car. There are many ways to build and install a stand to a module, the drawings show one made out of steel rods cut, bent and welded together. Regarding freight modules an operator should be able to manually extend and retract a stand from the exterior of a module. A cable that goes from the dolly to the module 23, not shown in FIG. 3, provides electric power to the modules. Vehicles are privately owned and passengers are expected to ride with the same comforts and amenities of a modern automobile. Vehicles can have movable seats so passengers can adjust them to face the forward movement or look back as the vehicle moves along the tracks.

A hanger to suspend the passengers and freight modules from the propulsion dolly allows the module to swing out in curved track sections so as to diffuse the centrifugal force and to remain in a horizontal position when the dolly traverses inclined track sections resulting in a more comfortable ride for passengers. A single passenger module in FIGS. 2 & 3 hangs from a propulsion dolly attached to a hanger 24 fabricated from stamped metal plates. A metal plate 25, partially drawn in FIG. 3, that extends down from the dolly structural frame between the tracks metal rails is shaped to have the wheels or rollers 13 that glide against the steel rails 3 convex bottom attached to it. Two metal plates 26, partially drawn in FIG. 3, are attached with bolts and nuts to both sides of the metal plate 25 that extends from the dolly, these will hold another metal plate 27 set between them with a custom made metal piece 28 that goes across them and allows rotation of metal plate 27 so that the module could remain in the horizontal position when a vehicle moves along inclined track sections. A metal plate 29 that extends from the module is set between two flanges 31 at the module and is attached to these with bolts and nuts, it has holes shown as circles in the drawing to make it lighter but still remain structurally sound. Both 27 & 29 metal plates have their respective ends cut and bent to form hinges. A pin 30 that holds metal plates 27 & 29 together allows lateral movement of the module in curved track sections so as to diffuse centrifugal forces. The same assembly can be used for a freight module.

Shock absorbers 32 attached to the hanger and custom metal piece 28 as shown in FIGS. 2 & 3 prevent the modules from swinging too hard and too far when they are moving resulting in a more comfortable ride for passengers. A constant controlled vehicle speed at curved track sections also helps to prevent the vehicles from swinging too far and recover a level position faster at straight track sections. When vehicles travel bumper to bumper the shock absorbers prevent the modules from hitting each other in a sudden stop for a safer ride too. A hanger can take any shape as long it allows the modules to swing out in curved track sections and to remain in a horizontal position in inclined track sections. A single metal rod, not shown, with ball joint ends that fit inside a dolly and module sockets and allows 360° swaying motions can be used instead to hang the module from the dolly. It will still need shock absorbers for the same reason as with a hanger made of stamped metal plates. Those skilled in the art of building contraptions made of cutting, stamping and bending metal plates should be able to build and install a hanger as the one shown in FIGS. 2 & 3. Other more complex devices to prevent the modules from swinging too hard and too far when they are moving or in a sudden stop are possible too.

The length of a hanger is an important design factor in this transportation system as it allows the tracks to remain overhead and the passengers to get in and out of the vehicles with the same ease as getting in and out of a car and it also allows for a more comfortable ride for the reasons previously explained. None of the prior art referenced in this Invention Specification considers this at all and it seems that no other transportation system prior art proposes the use of a hanger to suspend a passengers module from a propulsion dolly the same way and for the same reasons as proposed in this Invention Specification.

Figure 9:
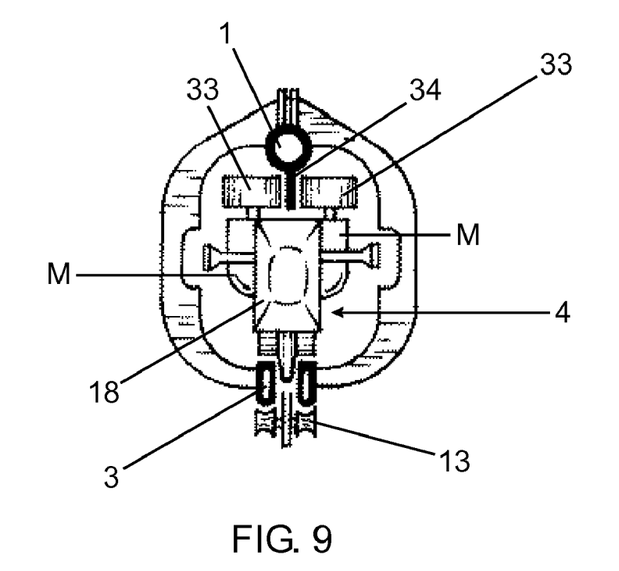
FIG. 9 shows the front or rear view of a propulsion dolly inside the tracks assembly and a transversal cut view of the tracks assembly steel rails and structural steel pipe of another embodiment of the invention.
Figure 10:
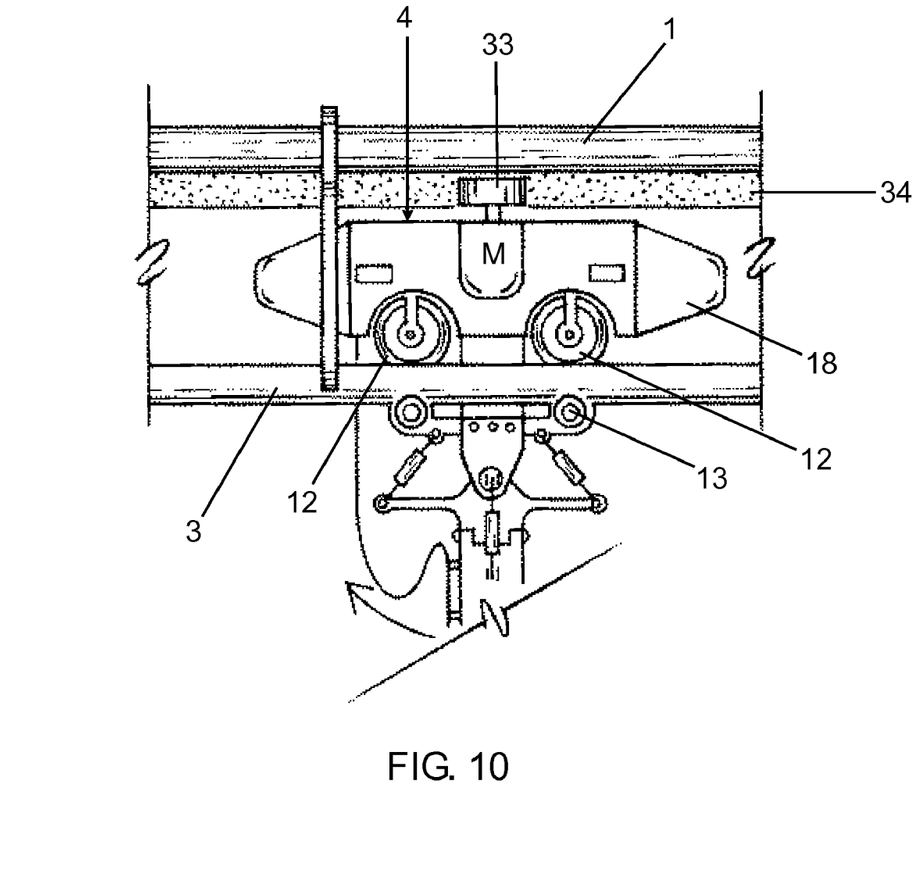
FIG. 10 shows a side view of a propulsion dolly inside a track section of another embodiment of the invention.

In another embodiment of the invention shown in FIGS. 9 & 10 a propulsion mechanism consists of at least two rubber drive wheels on top of the propulsion dolly 33 driven by conventional direct torque electric motors M that provide movement for the vehicle as these turn against a metal or composite materials band 34 attached either welded or mechanically fastened to the bottom of the structural steel pipe 1 of the tracks assembly. If a metal band is used it can have a replaceable contact surface made of a composite material that provides a better traction than steel in all types of weather. Since there's no need for a drive wheel at the track rails both end wheels of a propulsion dolly for this embodiment can be used as direction wheels. When both end wheels of a propulsion dolly are used for direction a vehicle will be able to traverse a track section in any direction as further described. FIG. 9 shows a propulsion dolly inside the track assembly that could be either a front or a back view and a transversal cut view of the tracks assembly steel rails and structural steel pipe. No contact is depicted between the dolly wheels, the smaller wheels or rollers 13 and the rails 3 for clarity. When vehicles merge and split in the "Y" shaped junctions and forks track sections a cut, not shown, in the metal band 34 is needed to allow the drive wheels to leave one track and engage another and a cut, not shown, at the track steel rails convex bottom is needed to allow the smaller wheels or rollers to leave a rail and engage another as it will become evident to anyone implementing the system. Since drive wheels are not capable of propulsion during the moment it takes to leave a track and engage another installing drive wheels at the front and the back of a propulsion dolly, not shown, is a way to have drive wheels providing movement for the vehicle all the time. No other prior art referred to in the Background of this Invention Specification proposes using wheels for propulsion in a similar way.

A metal band 34 attached to the bottom of the structural steel pipe of the tracks assembly 1 can also be used with the preferred embodiment of the invention for additional vehicle stability and a safer ride if wheels or rollers that glide against the band are installed on top of the propulsion dolly, not shown, and it can also be used to install a third rail, not shown, from which the vehicles can take electric power. If both invention embodiments are combined into one it will result in a sturdy more stable propulsion dolly capable of moving bigger modules with heavier loads.

Once inside a module all a passenger has to do to get to it's destination is to provide a verbal or panel command to program the vehicle to drive itself to a destination. An exterior control panel (not shown) or a remote control is used with freight modules to allow an operator to program a trip. Location markers and conventional electronic signals in the tracks along with sensors in the vehicles allow a computer on board each vehicle to use a navigation software to determine the exact position of a vehicle at any time and program the fastest way to a destination. The information is relayed wireless and over cable to computers at a master control that identifies each vehicle then handles and monitors vehicular flow along the tracks networks or trackways. This computer reliance automation is believed to be within the scope of the signaling, instrumentation and controls engineering and software applications of current driverless fully automated rail transportation systems.

The vehicles passengers module can travel close to the ground as a car does and over obstacles including cars and pedestrians along elevated track sections, proper clearance is a tracks assembly structural support design factor. Some track sections are designated to leave and pick up passengers at home and institutional, commercial and public spaces. Vehicles moving along elevated track sections will ride a loop until a space is available to leave and pickup passengers and will then descend to pedestrian level to do so. Once passengers leave their vehicles these can be sent anywhere on their own to pick up and transport other passengers or to a designated parking space and then these can later be recalled using a cell phone. Track sections with vehicles moving close to the ground should be enclosed or protected with barriers to prevent people and animals from getting in the way of a moving vehicle. Vehicles can be stopped manually from the inside of a passengers module or by using an external emergency stop button on premises accessible to anyone as a safety measure while they move close to the ground such as when leaving or picking up passengers. A full vehicle stop can be accomplished with conventional motorized vehicles friction braking systems components installed within the propulsion dolly wheels. The vehicles freight modules can also travel close to the ground to allow for easier loading and unloading of the modules.

Once the vehicles start moving there's no need for them to stop until they reach their destination as there are no crossings along the tracks path and there's no need for track switches to route vehicles to its destination since each vehicle has a steering mechanism. Tracks merge and split in "Y" shaped junctions and forks track sections. This configuration allows the propulsion dolly wheels to follow a continuous path from beginning to end of a programmed trip. The propulsion dolly motor will slow down or speed up controlled by a computer on board each vehicle to allow the vehicles to keep on rolling and merge without colliding with each other automatically. The motor traction is used to slow down a vehicle applying dynamic braking instead of using friction brakes to do so.

Figure 11:
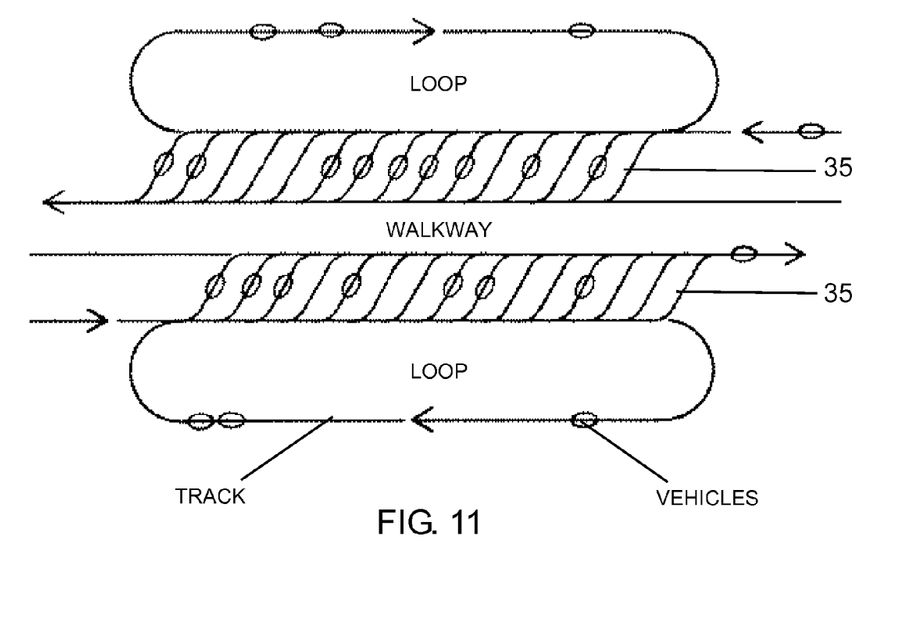
FIG. 11 is a schematic plan view of the tracks layout for leaving and picking up passengers at institutional, commercial and public spaces.
Figure 12:
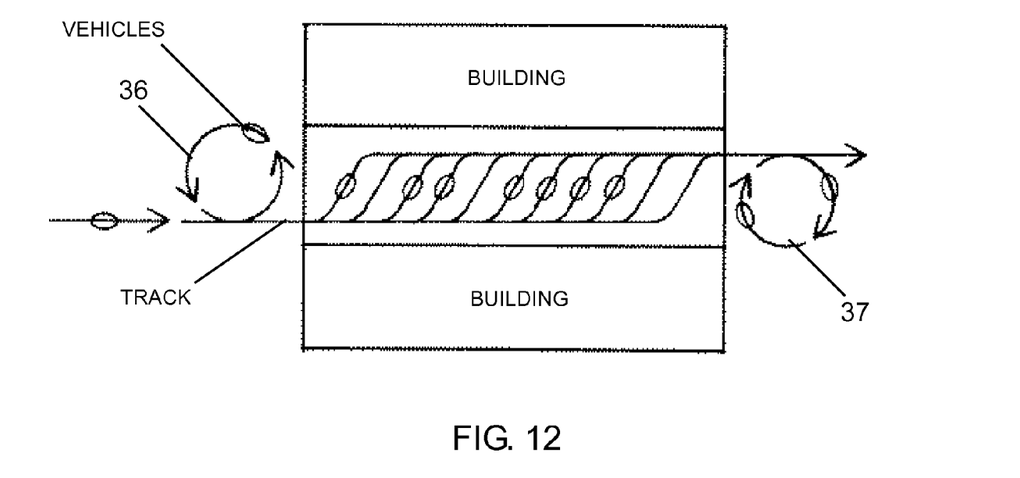
FIG. 12 is a schematic plan view of the tracks layout for leaving and picking up passengers inside buildings.

FIG. 11 is a schematic plan view of the tracks layout for leaving and picking up passengers at institutional, commercial and public spaces. The arrow heads indicate which way the vehicles move along the tracks. Vehicles moving along elevated track sections will ride a loop until a space is available to leave and pickup passengers 35 and will then descend to pedestrian level close enough to the ground to allow passengers to get in and out of the vehicles modules with the same ease as getting in and out of a car. An array of conventional signals and barriers, not shown, are used to protect pedestrians from being hit by a moving vehicle as passengers move from or to their vehicles. Same way vehicles can leave and pick up passengers inside buildings as shown in FIG. 12 in a schematic plan view. For floors above ground level vehicles travel a spiral track path up 36 and then another one down 37. Vehicles can also travel a spiral track section to get into a higher track or a lower one. Tracks can go around buildings attached to the buildings and from one building to another attached to bridges high above the ground, not shown. Freight vehicles can use the same tracks layout for loading and unloading modules inside a warehouse.

Figure 13:
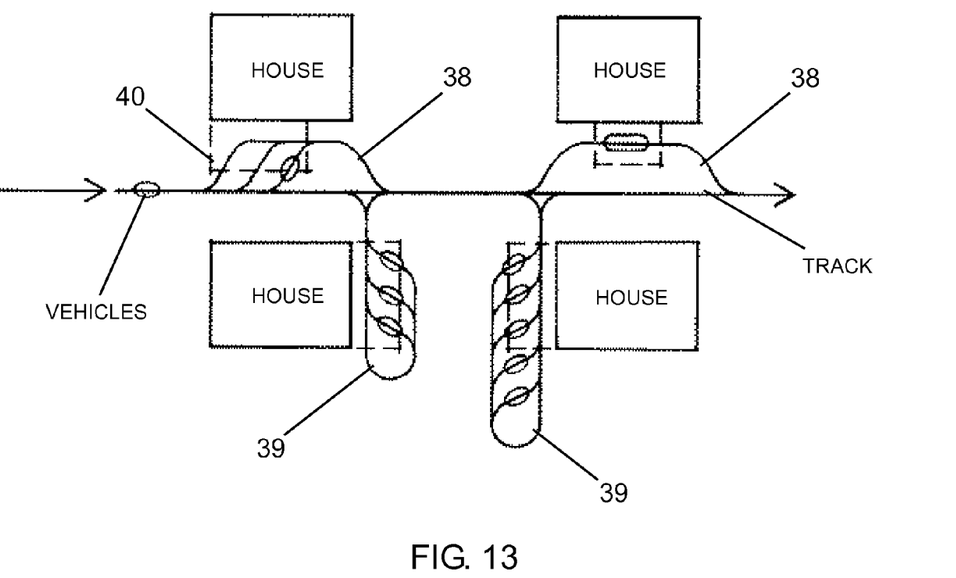
FIG. 13 is a schematic plan view of several track layouts for leaving and picking up passengers and parking vehicles in suburban residential developments.
Figure 14:
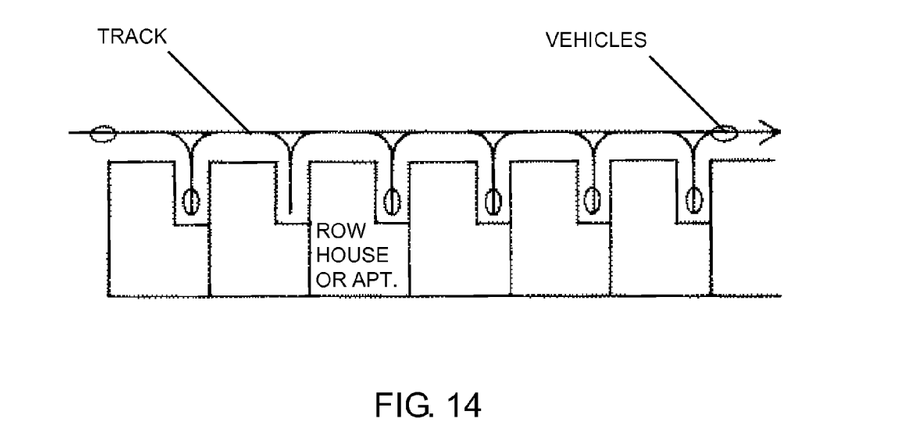
FIG. 14 is a schematic plan view of the tracks layout for leaving and picking up passengers and parking vehicles in row houses developments and apartments buildings.

FIG. 13 is a schematic plan view of several track layouts for leaving and picking up passengers and parking vehicles in suburban residential developments. These layouts provide either an entrance and exit track section 38 or a private loop 39. A private loop is convenient when there are several vehicles in a household. The dashed lines indicate a roof overhang 40 and the arrow heads again indicate which way the vehicles move along the tracks. When space is tight such as in row houses and in apartments buildings and entrance and exit track sections or a loop are not possible vehicles can only come out traversing across the same track section they got in after leaving and picking up passengers as shown in FIG. 14 in a schematic plan view. Only when both end wheels of a propulsion dolly are capable of providing direction as previously described can a vehicle come out traversing across the same track section they got in. Sending vehicles to a designated parking space after it leaves passengers in common areas is another option for row houses and apartments buildings. Freight vehicles can use a tracks layout similar to the one shown in FIG. 14 for loading and unloading of modules at buildings, a warehouse or a stockpile yard.

Figure 15:
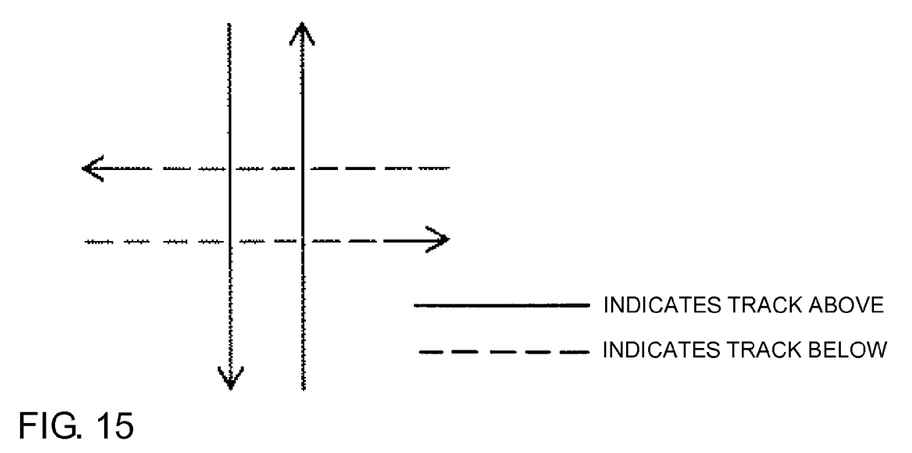
FIG. 15 is a schematic plan view that shows parallel tracks for vehicles moving in opposite directions one above the other as they meet perpendicularly.
Figure 16:
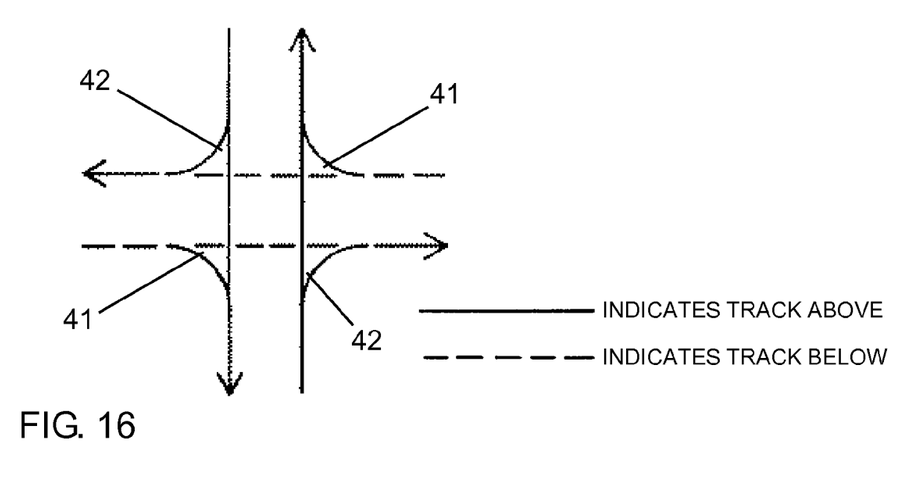
FIG. 16 is the same drawing as in FIG. 15 with additional ascending and descending track sections that allow vehicles to change direction from one perpendicular track to another.
Figure 17:
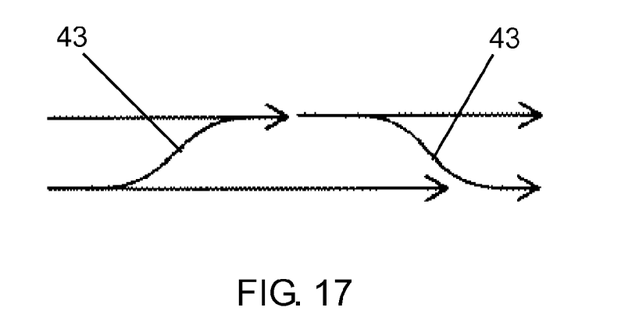
FIG. 17 is a schematic plan view of the tracks interchanges layout.
Figure 18:
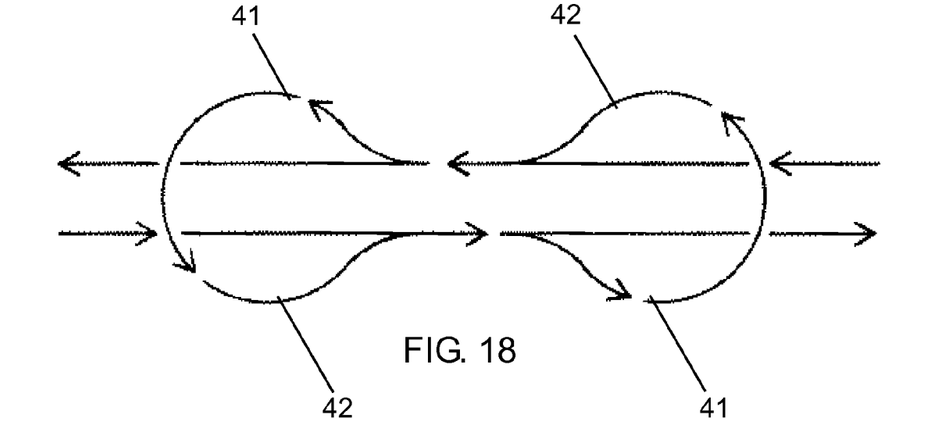
FIG. 18 is a schematic plan view of the tracks crossovers layout.
Figure 19:
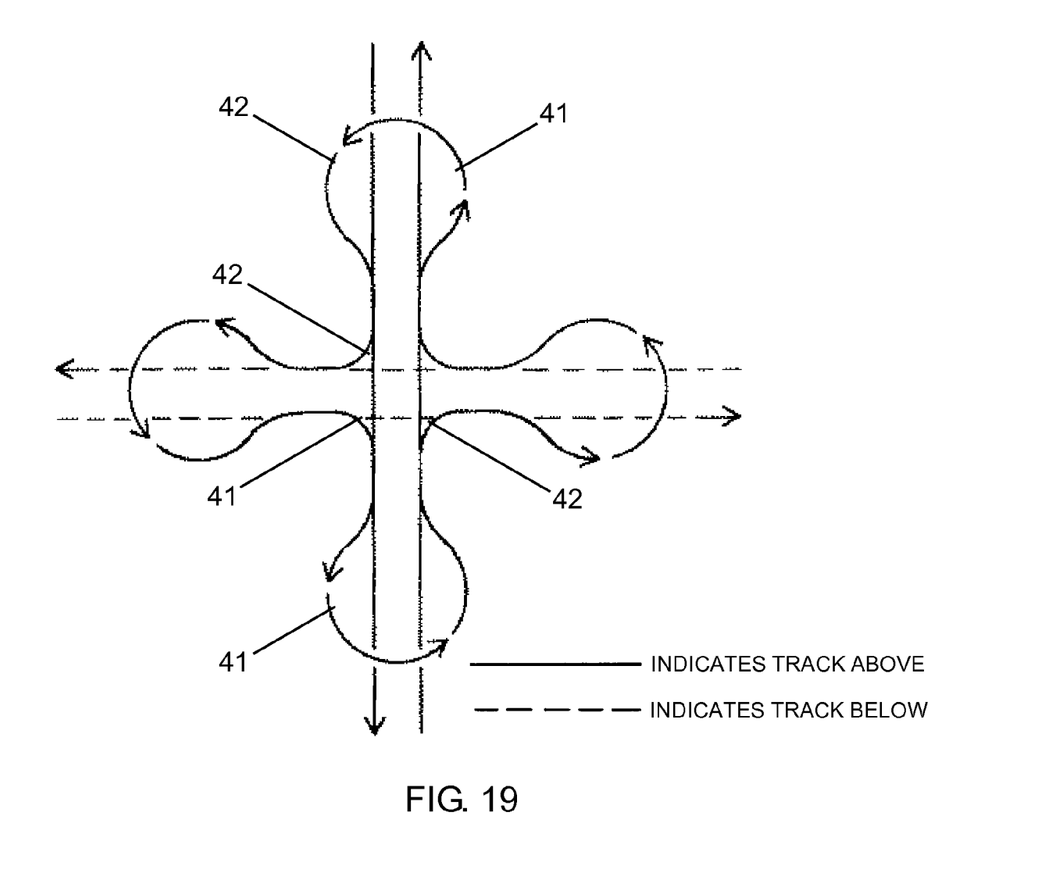
FIG. 19 is a schematic plan view of a two level cloverleaf interchange tracks layout.

To avoid crossings stops along the tracks path when perpendicular tracks meet these are installed one above the other. FIG. 15 is a schematic plan view that shows parallel tracks for vehicles moving in opposite direction one above the other as they meet perpendicularly. Again the arrow heads indicate which way the vehicles move along the tracks. To change direction from one perpendicular track to another vehicles traverse ascending 41 and descending 42 curved track sections as shown in FIG. 16 in a schematic plan view. When there are two or more parallel tracks with vehicles moving in the same direction interchanges track sections 43 allow vehicles to change tracks as shown in FIG. 17 in a schematic plan view. FIG. 18 is a schematic plan view of the crossover tracks interchanges layout that allows vehicles to change direction when moving in opposite direction in parallel tracks. To do so vehicles traverse ascending 41 and descending 42 curved track sections installed above the parallel tracks. FIG. 19 is a schematic plan view of a two level cloverleaf tracks interchange layout that allows moving vehicles to change direction as previously explained. These tracks layouts cover most of the tracks networks or trackways vehicular flow design considerations that allow vehicles to keep on moving until they reach their destination and are in many ways similar to those encountered by freeway designers.

Since such vehicles get their power from the tracks assembly there's no need to recharge them. A power meter and a relay device in each vehicle communicating wireless and over cable with a processing center allows for automatic electronic transactions so that each vehicle owner can be charged to their account for power consumption, tolls and vehicle registration. Batteries on each vehicle will provide for emergency power backup. If a vehicle losses propulsion due to a malfunction it will be pushed at the bumpers by other vehicles to the next emergency exit. In the event of an accident or structural failure of the tracks a master control can stop all vehicles at once and redirect traffic. Catwalks, not shown, with stairs to ground level installed at a convenient distance one from the other allow passengers to leave their vehicles in an emergency situation when the passengers modules are high above the ground.

I claim for this invention:

1. A personal transportation and freight delivery system comprising,
   - a network of interconnected tracks and self-propelled transport vehicle assemblies on said tracks,
   - said tracks comprising a plurality of vehicle support posts, at least one rail assembly suspended from said support post, said rail assembly comprising in combination a central longitudinally extending support pipe, multiple vehicle engagement rails interconnected in spaced parallel relation to said support pipe by a plurality of longitudinally spaced ties from said support pipe,
   - said vehicle assembly comprising a propulsion dolly on said tracks and a transport module suspended from said dolly,
   - said propulsion dolly comprises in combination, a dual surface engagement drive wheel registerable on and between said multiple vehicle engagement rails simultaneously and an inline steering wheel,
   - pairs of retaining rollers in spaced vertical aligned relation to said drive and steering wheel respectively,
   - a drive motor interengaged with said drive wheel,
   - an electromagnetic steering assembly extending from said steering wheel,
   - a power contact in selective communication with a power source in said track ties and said drive motors in said propulsion dolly,
   - said transport module comprises in combination, a multi-axis suspension system, comprising a hanger having first and second pivot points between said propulsion assembly and said transportation module, aligned pairs of shock absorbers in angularly disposed disposition to one another, a transport housing enclosure, access opening in said enclosure, a hanger interconnecting said propulsion dolly and said multi-axis suspension assembly,
   - power transfer means from said power contacts to said transport module and means for static propulsion dolly engagement separation.

2. The personal transport and freight delivery system set forth in claim 1 wherein said power source in said track comprises,
   - a third rail connected to a utility power grid.

3. The personal transport and freight delivery system set forth in claim 1 wherein said electromagnetic steering assembly comprises,
   - a steering rod extending from said steering wheel, a plurality of electromagnet coils positioned around central activation flanges on said rod selectively engaged by said electromagnetic coils upon selective activation thereof.

4. The personal transport and freight delivery system set forth in claim 1 wherein said transport housing further comprises,
   - a metal stand deployable from said transport housing in oppositely disposed relation to said transport module's multiple access suspension assembly for ground engagement.

5. The personal transport and freight delivery system set forth in claim 1 wherein said network of interconnected tracks further comprises, straight, curved, ascending and descending sections, Y-shaped junctions and fork track sections.

6. The personal transport and freight delivery system set forth in claim 1 wherein said delivery system further comprises a destination programmable controller within each of said transport modules, and a central transport module tracking and relative position orientation system.

7. The personal transport and freight delivery system set forth in claim 6 wherein said module tracking and positioning system comprises, a plurality of sensors within said track,
   - a remote central computer in communication with said sensors and said programmable controller in each of said transport modules, means for sensor track activation and identification of said propulsion module passing thereover.

* * * * *